US009401078B2

(12) United States Patent  
Barrett

(10) Patent No.: US 9,401,078 B2  
(45) Date of Patent: Jul. 26, 2016

(54) SYSTEMS AND METHODS FOR MUTING VISUAL INDICATORS IN AN INFORMATION HANDLING SYSTEM

(71) Applicant: Dell Products L.P., Round Rock, TX (US)

(72) Inventor: Robert Barrett, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 14/190,767

(22) Filed: Feb. 26, 2014

(65) Prior Publication Data

US 2015/0243140 A1 Aug. 27, 2015

(51) Int. Cl.
*G08B 5/36* (2006.01)
*G06F 1/18* (2006.01)
*G08B 5/38* (2006.01)

(52) U.S. Cl.
CPC ........... *G08B 5/36* (2013.01); *G06F 1/181* (2013.01); *G08B 5/38* (2013.01)

(58) Field of Classification Search
CPC .............. G08B 5/00–5/40; H04N 5/77; H04N 5/765–5/775; A61B 1/00022–1/00039
See application file for complete search history.

(56) References Cited

U.S. PATENT DOCUMENTS

| | | | | | |
|---|---|---|---|---|---|
| 3,986,203 | A | * | 10/1976 | Davis | 348/189 |
| 4,481,512 | A | * | 11/1984 | Tscheulin et al. | 455/346 |
| 5,144,441 | A | * | 9/1992 | Sparks et al. | 348/730 |
| 5,489,249 | A | * | 2/1996 | Brewer et al. | 482/5 |
| 5,645,509 | A | * | 7/1997 | Brewer et al. | 482/4 |
| 5,708,417 | A | * | 1/1998 | Tallman et al. | 340/539.23 |
| 6,104,423 | A | * | 8/2000 | Elam | 725/28 |
| 6,216,263 | B1 | * | 4/2001 | Elam | 725/28 |
| 6,295,567 | B1 | * | 9/2001 | Bassman et al. | 710/104 |
| 6,593,851 | B1 | * | 7/2003 | Bornstein | 340/539.15 |
| 7,129,851 | B1 | * | 10/2006 | Garnett | 340/815.4 |
| 8,666,026 | B1 | * | 3/2014 | Brethour | 379/9.06 |
| 2004/0109193 | A1 | * | 6/2004 | Smith et al. | 358/1.14 |
| 2004/0128562 | A1 | * | 7/2004 | Bigelow et al. | 713/300 |
| 2004/0133072 | A1 | * | 7/2004 | Kennedy | 600/109 |
| 2005/0052856 | A1 | * | 3/2005 | Williams | 361/796 |
| 2006/0015008 | A1 | * | 1/2006 | Kennedy | 600/109 |
| 2006/0050144 | A1 | * | 3/2006 | Kennedy | 348/65 |
| 2007/0208766 | A1 | * | 9/2007 | Malik | 707/101 |
| 2007/0266192 | A1 | * | 11/2007 | Campini et al. | 710/301 |
| 2008/0126630 | A1 | * | 5/2008 | Farkas et al. | 710/69 |
| 2009/0319896 | A1 | * | 12/2009 | Green et al. | 715/708 |
| 2010/0058234 | A1 | * | 3/2010 | Salame et al. | 715/810 |
| 2011/0156862 | A1 | * | 6/2011 | Langer | 340/4.37 |
| 2011/0161877 | A1 | * | 6/2011 | Chapra et al. | 715/810 |

(Continued)

*Primary Examiner* — Hai Phan
*Assistant Examiner* — Orlando Bousono
(74) *Attorney, Agent, or Firm* — Jackson Walker L.L.P.

(57) ABSTRACT

A chassis may include a plurality of slots each configured to receive a module having one or more information handling resources, wherein each slot is configured to electrically and communicatively couple the module to other components of the chassis. The chassis may also include a controller communicatively coupled to the plurality of slots. The controller may be configured to receive an electrical signal indicative of a user action associated with the chassis. The controller may also be configured to, responsive to the electrical signal: cause a first visual indicator associated with a first module received in the chassis to indicate a selection; for a period of time following receipt of the electrical signal, cause at least one second visual indicator of modules received in the chassis to mute; and at the conclusion of the period of time, cause the at least one second visual indicator to unmute.

10 Claims, 5 Drawing Sheets

(56) References Cited

U.S. PATENT DOCUMENTS

| | | | |
|---|---|---|---|
| 2012/0098343 A1* | 4/2012 | Harris et al. | 307/48 |
| 2012/0194350 A1* | 8/2012 | Crisp et al. | 340/815.42 |
| 2013/0099905 A1* | 4/2013 | Langer | 340/12.54 |
| 2014/0298067 A1* | 10/2014 | Reynov et al. | 713/324 |
| 2014/0380334 A1* | 12/2014 | Khessib et al. | 719/313 |
| 2015/0057976 A1* | 2/2015 | Yang et al. | 702/189 |

\* cited by examiner

SYSTEMS AND METHODS FOR MUTING VISUAL INDICATORS IN AN INFORMATION HANDLING SYSTEM

TECHNICAL FIELD

The present disclosure relates to modular information handling systems. More specifically, embodiments of the disclosure provide systems and methods for muting visual indicators in an information handling system chassis in order to assist a user in determining which system or component of the chassis is being selected in response to a user action.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system (or a single hypervisor running multiple virtualized operating systems) and input/output ("I/O") resources at a time, or bulky blade server chassis providing multiple servers and I/O control modules in a single chassis. A system chassis with multiple information handling systems with various peripheral and I/O capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and I/O capabilities common to the chassis as a whole presents numerous challenges.

For example, various modular information handling systems and components of the information handling system may include visual indicators, including for example, light-emitting diodes (LEDs), that may provide indication of numerous statuses and/or events associated with the various modular information handling systems and components. In some instances, one or more visual indicators may provide a visual indication (e.g., illumination, flashing, change in color, etc.) indicating selection of an information handling system or components in response to a user action (e.g., pressing of a keyboard-video-mouse selection button, selection of a node identifier button, etc.) If the number of information handling systems and components engaged with the chassis is significant, the system may include numerous visual indicators, each simultaneously providing indication of status or event information. Such volume of visual indicators may cause a large amount of visual "noise" from the perception of a user, rendering it difficult to determine which indicator is providing an indication in response to a user action.

SUMMARY

In accordance with the teachings of the present disclosure, the disadvantages and problems associated with traditional approaches to identifying information handling resources in a modular chassis may be substantially reduced or eliminated.

In accordance with embodiments of the present disclosure, a method may comprise, in a chassis comprising a plurality of slots each configured to receive a module and electrically and communicatively couple the module to other components of the chassis, receiving an electrical signal indicative of a user action associated with the chassis. The method may also comprise, responsive to the electrical signal causing a first visual indicator associated with a first module received in the chassis to indicate a selection; for a period of time following receipt of the electrical signal, causing at least one second visual indicator of modules received in the chassis to mute; and at the conclusion of the period of time, causing the at least one second visual indicator to unmute.

In accordance with these and other embodiments of the present disclosure, a chassis may include a plurality of slots each configured to receive a module having one or more information handling resources, wherein each slot is configured to electrically and communicatively couple the module to other components of the chassis. The chassis may also include a controller communicatively coupled to the plurality of slots. The controller may be configured to receive an electrical signal indicative of a user action associated with the chassis. The controller may also be configured to, responsive to the electrical signal: cause a first visual indicator associated with a first module received in the chassis to indicate a selection; for a period of time following receipt of the electrical signal, cause at least one second visual indicator of modules received in the chassis to mute; and at the conclusion of the period of time, cause the at least one second visual indicator to unmute.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
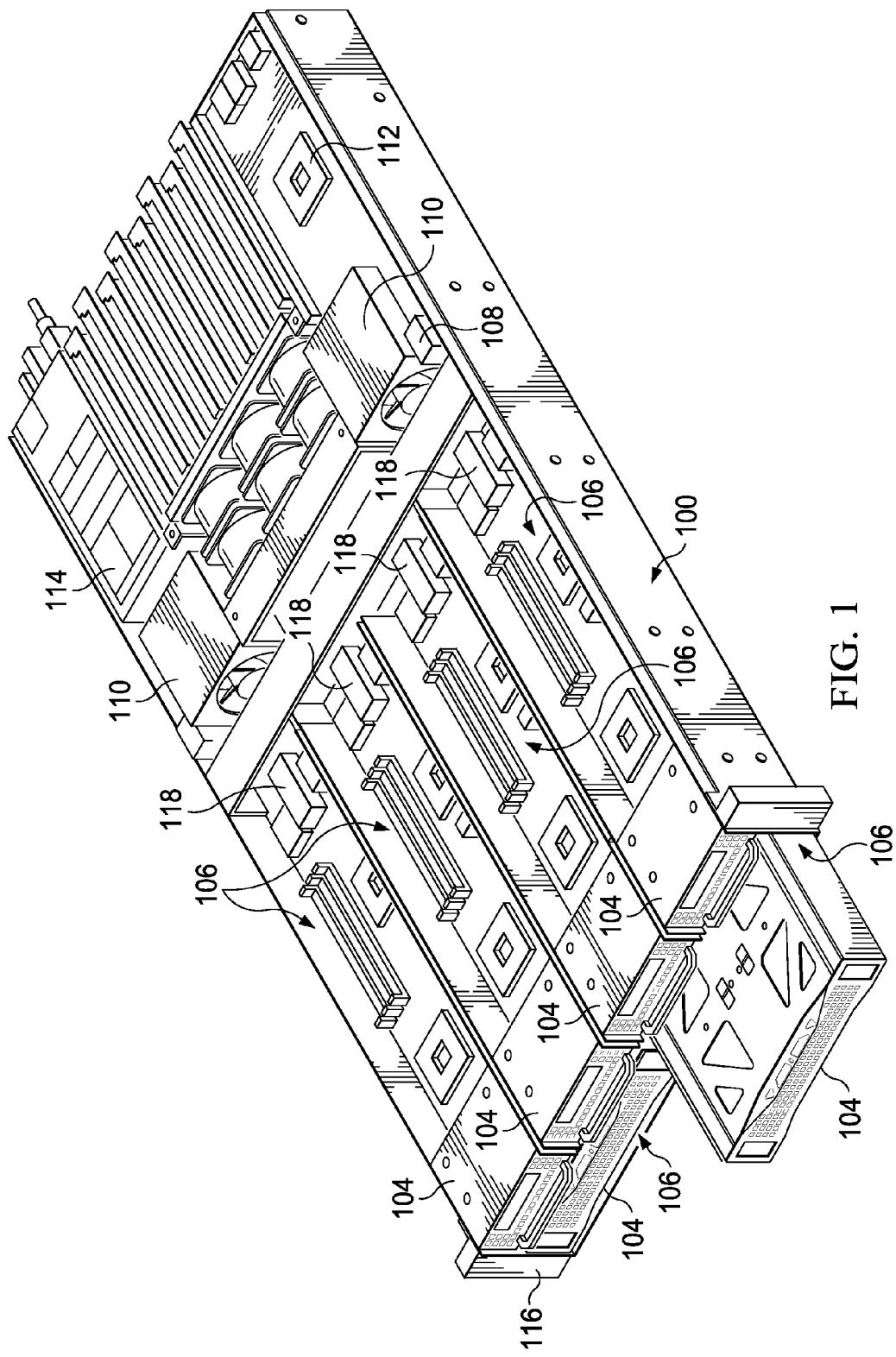
FIG. 1 illustrates a cut-away perspective view of a chassis for receiving modular information handling resources, in accordance with embodiments of the present disclosure.

FIG. 1 illustrates a perspective view of a chassis 100 for receiving modular information handling resources, in accordance with embodiments of the present disclosure, with certain elements (e.g., walls for enclosing components within chassis 100) cut-away or removed in order to show information handling resources internal to chassis 100. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include one or more slots 106 configured to receive drawers 104 for carrying information handling resources, as described in greater detail below. For example, some drawers 104 may include one or more information handling systems. As another example, some drawers 104 may include one or more peripherals (e.g., hard disk drives, graphics processing units, etc.) associated with information handling systems disposed in another drawer 104.

Each drawer 104 may include an interface connector 118 configured to electrically couple to a midplane 108, thus providing electrical coupling between information handling resources carried on the various drawers 104 to each other and/or one or more networks or devices external to chassis 100. Midplane 108 may comprise any system, device, or apparatus configured to interconnect information handling resources of chassis 100 with each other. Accordingly, midplane 108 may include slots, pads, and/or other connectors configured to receive corresponding electrical connectors of information handling resources in order to electrically couple information handling systems disposed in drawers 104 and/or information handling resources to each other.

A chassis management controller (CMC) 112 may be communicatively coupled to midplane 108 and may comprise any system, device, or apparatus configured to facilitate management and/or control of components of chassis 100, information handling systems modularly coupled within, and/or one or more of its component information handling resources. CMC 112 may be configured to issue commands and/or other signals to manage and/or control information handling systems coupled to slots 106 and/or information handling resources of chassis 100. CMC 112 may comprise a microprocessor, microcontroller, DSP, ASIC, field programmable gate array ("FPGA"), EEPROM, or any combination thereof.

In addition or alternatively, CMC 112 may also provide a management console for user/administrator access to these functions. For example, CMC 112 may provide for communication with a user interface (e.g., user interface 116), permitting a user to interact with CMC 112 and configure control and management of components of chassis 100 by CMC 112. As another example, CMC 112 may implement Web Services Management ("WS-MAN") or another suitable management protocol permitting a user to remotely access a CMC 112 to configure chassis 100 and its various information handling resources. In such embodiments, a CMC 112 may interface with a network interface separate from a traditional network interface of chassis 100, thus allowing for "out-of-band" control of chassis 100, such that communications to and from CMC 112 are communicated via a management channel physically isolated from an "in band" communication channel with the traditional network interface. Thus, for example, if a failure occurs in chassis 100 that prevents an administrator from interfacing with chassis 100 via a traditional network interface and/or user interface 116 (e.g., operating system failure, power failure, etc.), the administrator may still be able to monitor and/or manage chassis 100 (e.g., to diagnose problems that may have caused failure) via CMC 112. In the same or alternative embodiments, CMC 112 may allow an administrator to remotely manage one or more parameters associated with operation of chassis 100 and its various information handling resources (e.g., power usage, processor allocation, memory allocation, security privileges, etc.).

One or more air movers 110 may be communicatively coupled to CMC 112, and may include any mechanical or electro-mechanical system, apparatus, or device operable to move air and/or other gasses. In some embodiments, an air mover 110 may comprise a fan (e.g., a rotating arrangement of vanes or blades which act on the air). In other embodiments, an air mover 110 may comprise a blower (e.g., a centrifugal fan that employs rotating impellers to accelerate air received at its intake and change the direction of the airflow). In these and other embodiments, rotating and other moving components of an air mover 110 may be driven by a motor. The rotational speed of such motor may be controlled by one or more control signals communicated from CMC 112. In operation, an air mover 110 may cool information handling systems and information handling resources of chassis 100 by drawing cool air into chassis 100 from outside chassis 100, expelling warm air from inside chassis 100 to the outside of chassis 100, and/or moving air across one or more heatsinks (not explicitly shown) internal to chassis 100 to cool one or more information handling systems and/or information handling resources. Although FIG. 1 depicts chassis 100 as having two air movers 110, chassis 100 may include any suitable number of air movers 110.

As shown in FIG. 1, chassis 100 may include one or more power supplies 114. Generally speaking, a power supply 114 may include any system, device, or apparatus configured to supply electrical current to one or more information handling resources within chassis 100.

A user interface 116 may include any system, apparatus, or device via which a user may interact with chassis 100 and its various components by facilitating input from a user allowing the user to manipulate chassis 100 and output to a user allowing chassis 100 to indicate effects of the user's manipulation. For example, user interface 116 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of chassis 100 and receive power from one or more power supplies 114 of chassis 100, rather than being coupled to chassis 100 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 116 may include other user interface elements (e.g., a keypad, buttons, and/or switches placed in proximity to a display) allowing a user to provide input to chassis 100. In these and other embodiments, user interface 116 may include one or more visual indicators, such as light-emitting diodes, for example, for communicating information to a user. User interface 116 may be coupled to CMC 112 and/or other components of chassis 100, and thus may allow a user to configure various information handling systems and/or information handling resources of chassis 100.

Figure 2:
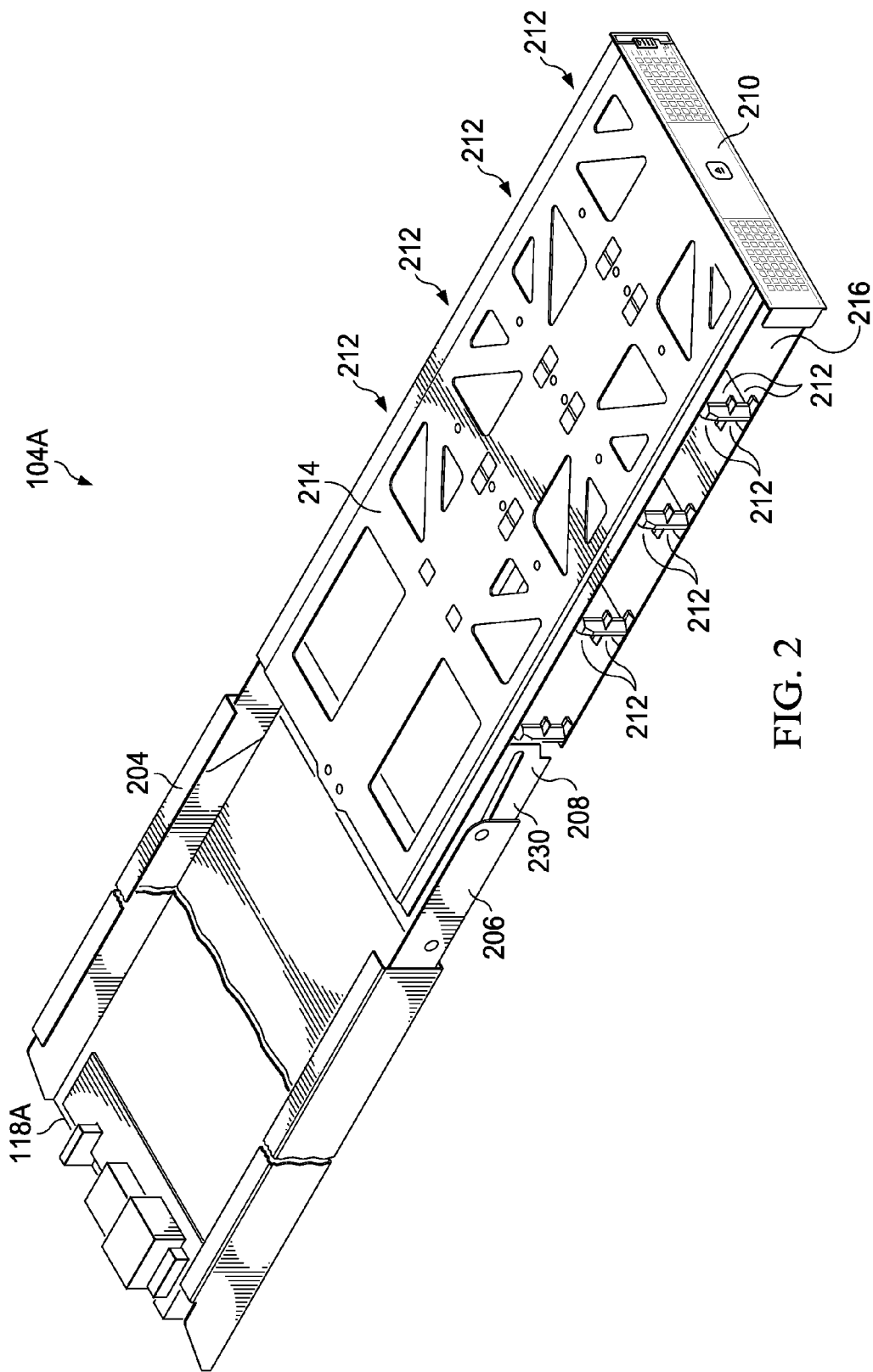
FIG. 2 illustrates a perspective view of an example chassis drawer for carrying modular information handling resources, the drawer in an open position, in accordance with embodiments of the present disclosure.
Figure 3:
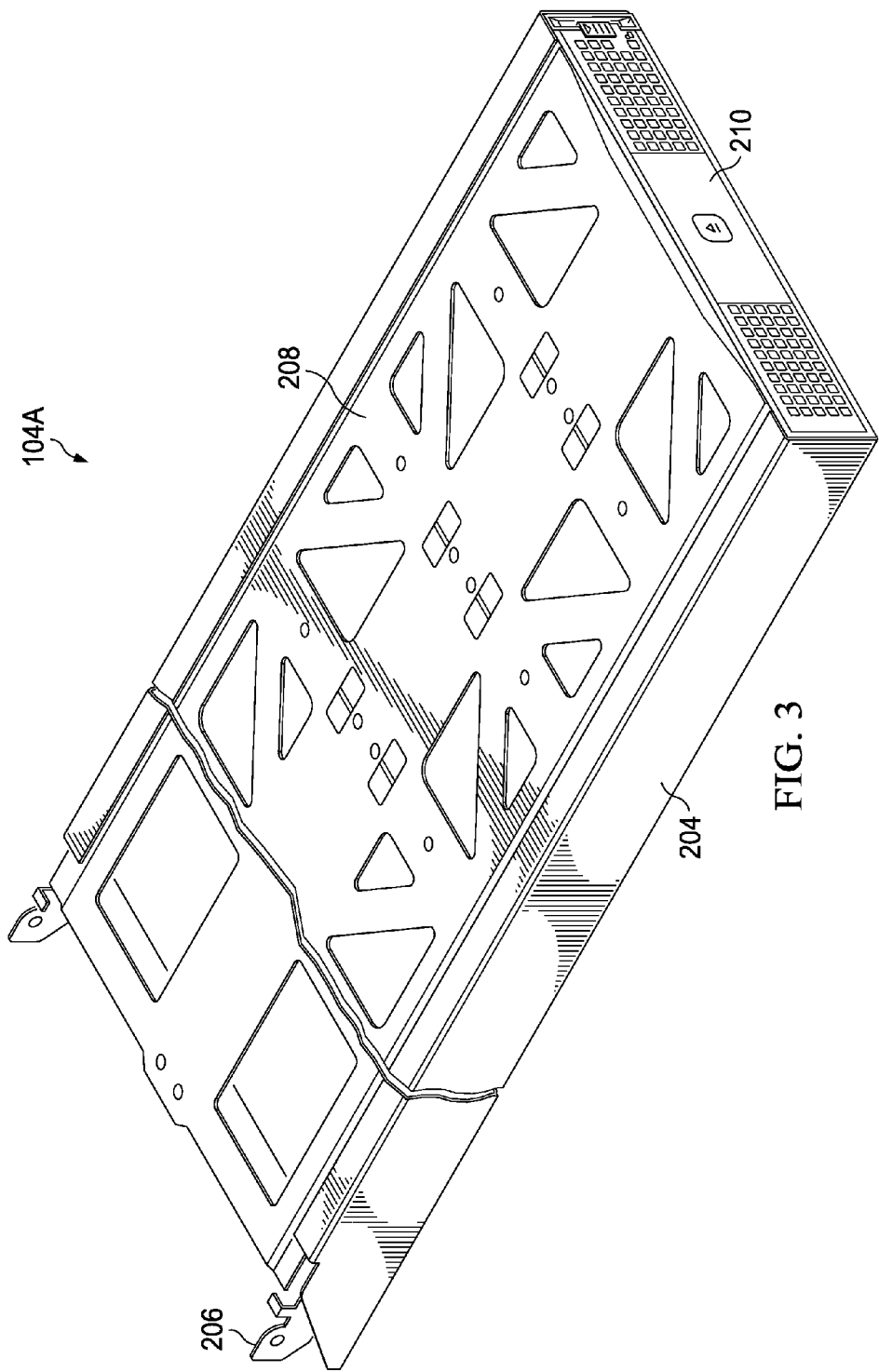
FIG. 3 illustrates a perspective view of an example chassis drawer for carrying modular information handling resources, the drawer in a closed position, in accordance with embodiments of the present disclosure.

FIGS. 2 and 3 depict various views of an example chassis drawer 104A for carrying modular information handling resources, in accordance with embodiments of the present disclosure. FIG. 2 illustrates a perspective view of an example chassis drawer 104A for carrying modular information handling resources, wherein drawer 104A is in an open position drawn from chassis 100, in accordance with embodiments of the present disclosure. FIG. 3 illustrates a perspective view of chassis drawer 104A for carrying modular information handling resources, wherein drawer 104A is in a closed position relative to chassis 100, in accordance with embodiments of the present disclosure.

As shown in FIGS. 2 and 3, chassis drawer 104A may comprise an inner member 204, an intermediate member 206 mechanically coupled to inner member 204, and a carrier member 208 mechanically coupled to intermediate member 206. Inner member 204 may be constructed from steel, aluminum, plastic, and/or any other suitable material. Although inner member 204 may have any suitable size and/or shape, inner member 204 is depicted in the embodiments of FIGS. 2 and 3 as having two substantially planar and parallel opposite sides defining a drawer height coupled to each other by a substantially planar bottom generally perpendicular to the sides defining a drawer width and a guide flange extending from and running perpendicular to and along the length of each side such that the flanges project towards each other. In some embodiments, inner member 204 may be mechanically coupled to the internal mechanical structure of chassis 100, such that inner member 204 is fixed relative to chassis 100.

Intermediate member 206 may be constructed from steel, aluminum, plastic, and/or any other suitable material. Although intermediate member 206 may have any suitable size and/or shape, intermediate member 206 is depicted in the embodiments of FIGS. 2 and 3 as having two generally parallel and planar opposite sides coupled to each other by a substantially planar bottom generally perpendicular to the sides. The height of the sides and the width of the bottom may be such that the corresponding sides and bottom of inner member 204 provide a mechanical guide for intermediate member 206 as chassis drawer 104A is opened and closed. Intermediate member 206 may be mechanically coupled to inner member 204 via bearings and/or other mechanical components such that intermediate member 206 may slide relative to inner member 204 in a direction perpendicular to the drawer height and drawer width defined by inner member 204. In some embodiments, intermediate member 206 may be limited in the distance it may be drawn from chassis 100 through any combination of suitable structural elements. Similarly, in some embodiments, other mechanical components may restrict motion of intermediate member 206 relative to inner member 204 as chassis drawer 104A is translated from the open position to the closed position.

Carrier member 208 may be constructed from steel, aluminum, plastic, and/or any other suitable material. Although carrier member 208 may have any suitable size and/or shape, carrier member 208 is depicted in the embodiments of FIGS. 2 and 3 as having a substantially planar top 214 and a substantially planar bottom 216 generally parallel to each other defining a width and depth of carrier member 208, the top 214 and bottom 216 mechanically coupled to each other by one or more structural elements defining a height of carrier member 208, such that top 214 and bottom 216 are generally perpendicular to the sides of intermediate member 206. Carrier member 208 may also include a face 210 mechanically affixed to top 214 and/or bottom 216. As shown in FIGS. 2 and 3, top 214 may include one or more openings (e.g., above bays 212) allowing for gaseous fluid to pass through. Similarly, bottom 216 may also include one or more openings (e.g., below bays 212) allowing for gaseous fluid to pass through.

In some embodiments, face 210 may be substantially equal in width to the width of carrier member 208 and substantially equal to the height of carrier member 208. In these and other embodiments, face 210 may include handles, pull tabs, and/or other features allowing a person to pull on face 210 in order to translate chassis drawer 104A from a closed position to an open position in a direction generally parallel to the depth of top 214 and bottom 216. In these and other embodiments, face 210 may include a grill, vent, and/or other opening allowing gaseous fluid to enter and/or exit through face 210.

As shown in FIG. 2, each side of carrier member 208 (e.g., portions of carrier member 208 between the edges of and substantially parallel to top 214 and bottom 216) may include a web 230 configured to mechanically couple carrier member 208 to intermediate member 206, as well as openings for a plurality of bays 212.

Each of the various bays 212 defined by drawer 104A may include one or more electrical components for coupling an information handling resource (e.g., a hard disk drive) inserted into such bay 212 to other information handling resources of chassis 100. For example, a backplane (not explicitly shown) may couple a modular information handling resource disposed in a bay 212 to interface connector 118A, which, as described above, may in turn be coupled to midplane 108. In some embodiments, the various information handling resources may be coupled to interface connector 118A such that when chassis drawer 104A is drawn open relative to chassis 100, such information handling resources maintain electrical conductivity to interface connector 118A and interface connector 118A may maintain electrical conductivity to midplane 108, thus permitting insertion or removal of an information handling resource without affecting operation of other information handling resources carried by chassis drawer 104A. In such embodiments, interface connector 118A may only be decoupled from midplane 108 when the entirety of chassis drawer 104A is removed from chassis 100.

Figure 4:
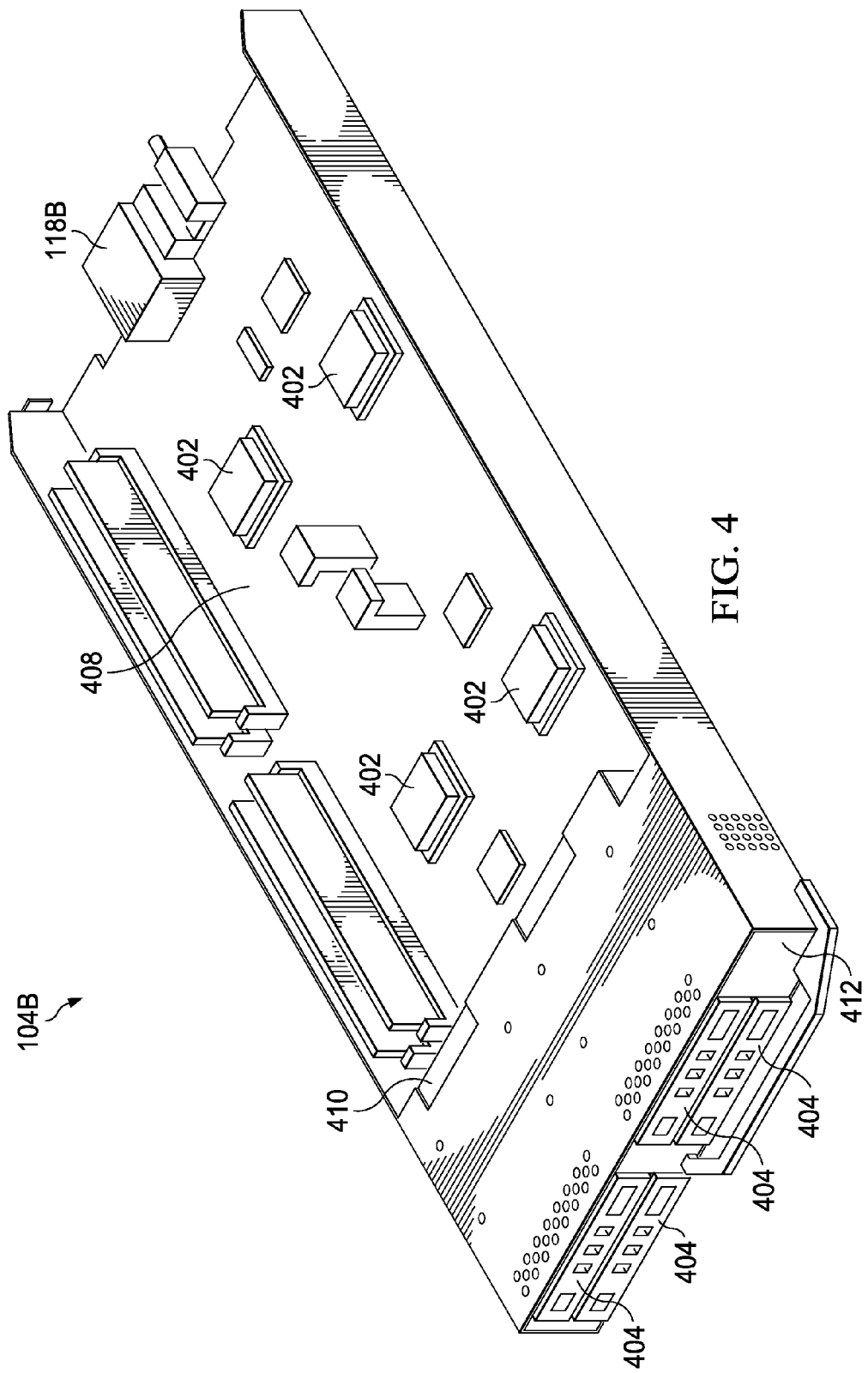
FIG. 4 illustrates a perspective view of another example chassis drawer for carrying information handling resources, in accordance with embodiments of the present disclosure.

FIG. 4 illustrates a perspective view of another example chassis drawer 104B for carrying information handling resources, in accordance with embodiments of the present disclosure. Although not labeled in detail as in FIGS. 2 and 3, chassis drawer 104B may include one or more mechanical and/or structural elements (e.g., similar or identical to inner member 204, intermediate member 206, and carrier member 208) for translating chassis drawer 104B between open and closed positions relative to chassis 100. Similar to chassis drawer 104A, the various information handling resources carried by chassis drawer 104B may be coupled to interface connector 118B such that when chassis drawer 104B is drawn open relative to chassis 100, such information handling resources maintain electrical conductivity to interface connector 118B and interface connector 118B may maintain electrical conductivity to midplane 108, thus permitting insertion or removal of an information handling resource without affecting operation of other information handling resources carried by chassis drawer 104B. In such embodiments, interface connector 118B may only be decoupled from midplane 108 when the entirety of chassis drawer 104B is removed from chassis 100.

In the particular chassis drawer 104B depicted in FIG. 4, a backplane 408 may have thereon a plurality (e.g., four) of processors 402 and a chipset associated with each processor 402, thus defining four independent information handling systems carried by chassis drawer 104B. Interface connector 118B may also be coupled to backplane 408, thus coupling processors 402 to information handling resources of chassis 100 external to chassis drawer 104B. In addition, the particular chassis drawer 104B depicted in FIG. 4 may include a plurality (e.g., four) of hard disk drives 404 communicatively coupled to backplane 408 (and thus one or more of processors 402) via a drive backplane 410.

As shown in FIG. 4, chassis drawer 104B may comprise a user interface 412. User interface 412 may include any system, apparatus, or device via which a user may interact with compute nodes (e.g., via a remote access controller such as an Integrated Dell Remote Access Controller or "iDRAC" for example) of chassis drawer 104B and its various components by facilitating input from a user allowing the user to compute nodes and to indicate effects of the user's manipulation. For example, user interface 412 may include a display suitable for creating graphic images and/or alphanumeric characters recognizable to a user, and may include, for example, a liquid crystal display, a cathode ray tube, a plasma screen, and/or a digital light processor projection monitor. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 412 may include other user interface elements (e.g., a keypad, buttons, and/or switches placed in proximity to a display) allowing a user to provide input to one or more compute nodes of chassis drawer 104B. In these and other embodiments, user interface 412 may include one or more visual indicators, such as light-emitting diodes, for example, for communicating information to a user.

Although FIGS. 2-4 depict particular example chassis drawers 104, chassis drawers 104 with other configurations may be employed consistent with the systems and methods herein disclosed. For example, in some embodiments, a chassis drawer 104 similar to that of chassis drawer 104B may include only one processor, such that the chassis drawer includes one compute node.

By combining different sizes and types of chassis drawers 104 in chassis 100, a user may create a multitude of different configurations of computing systems. For example, associations may be configured between information handling resources carried on a peripheral chassis drawer 104 to a compute node carried on a compute node chassis drawer 104. As used herein, a compute node chassis drawer 104 may comprise a chassis drawer 104 carrying one or more processors, such that one or more information handling systems, or compute nodes, are carried on the compute node chassis drawer. A peripheral chassis drawer 104 may comprise a chassis drawer 104 which does not carry a compute node, but carries one or more information handling resources (e.g., hard disk drives) for use by a compute node. Thus, a user may create one or more independent computing systems, each computing system comprising a compute node chassis drawer 104 and a peripheral chassis drawer 104.

Figure 5:
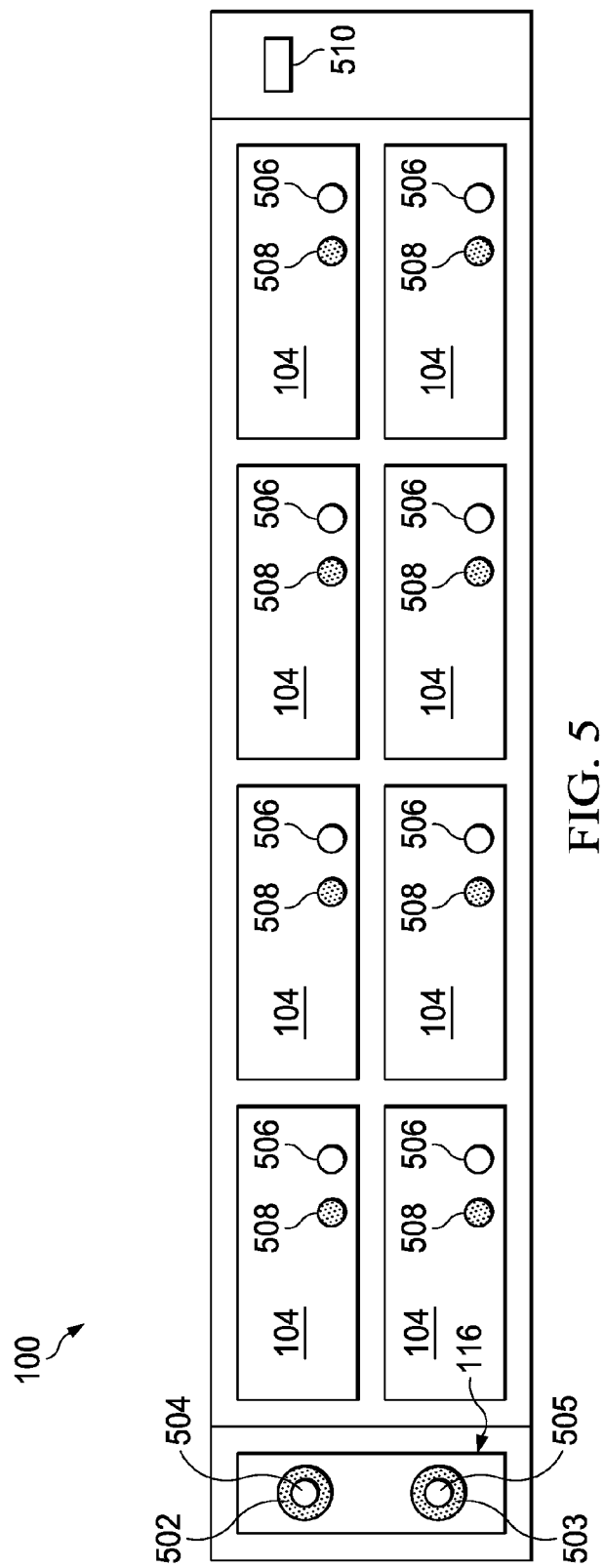
FIG. 5 illustrates a plan view of the chassis depicted in FIG. 1, in accordance with embodiments of the present disclosure.

FIG. 5 illustrates a plan view of chassis 100 having chassis drawers 104 disposed therein, in accordance with embodiments of the present disclosure. As shown in FIG. 5, user interface 116 of chassis 100 may include interface buttons 502 and 503. Interface buttons 502 and 503 may each include any electromechanical device, system, or apparatus configured to actuate an electronic signal to be communicated to one or more other components of chassis 100 (e.g., CMC 112), in response to a user interaction with such interface button 502 or 503 (e.g., interface button 502 or 503 being depressed by a user or otherwise manipulated). For example, responsive to user interaction with interface button 502, a compute node of emphasis for KVM, including a compute node of emphasis for a display coupled to connector 510, may be modified, such that the user may select a desired compute node for emphasis by interacting with interface button 502 until the desired compute node has emphasis. As another example, interface button 503 may comprise a "node select" button, such that responsive to user interaction with interface button 503, a selected compute node or information handling resource may change and cycle among such compute nodes or information handling resources as interface button 503 is pressed.

In some embodiments, interface button 502 may include a visual indicator 504. Likewise, interface button 503 may include a visual indicator 505. Visual indicators 504 and 505 may each include any device, system, or apparatus for providing a human-perceptible visual indication to a user of an event related to its associated interface button 502 or 504, as described in greater detail below. In some embodiments, visual indicator 504 may comprise an LED. Although visual indicator 504 is shown as integral to interface button 502, in some embodiments visual indicator 504 may be separate from, but proximate to interface button 502.

Also as depicted in FIG. 5, chassis 100 may include a connector 510. Connector 510 may include any device, system, or apparatus configured to communicatively couple a peripheral device external to chassis 100 (e.g., a display monitor) to components internal to chassis 100. For example, in some embodiments, connector 510 may comprise a Video Graphics Array (VGA) connector.

One or more of the various chassis drawers 104 configured for use with chassis 100 may each include one or more visual indicators 506 and 508. Each of visual indicators 506 and 508 may include any device, system, or apparatus for providing a human-perceptible visual indication to a user of an event related to its associated chassis drawer 104, as described in greater detail below.

In a compute node chassis drawer 104 comprising multiple compute nodes (e.g., chassis drawer 104B of FIG. 4), such chassis drawer 104 may include multiple of one or more of visual indicators 506 and 508 (e.g., one for each compute node) and/or may have a visual indicator 506 or 508 configured to display a different visual indication for each compute node (e.g., different color). Similarly, in a peripheral chassis drawer 104 comprising individual peripherals (e.g., hard disk drives), such chassis drawer 104 may include multiple visual indicators 506 and/or 508 (e.g., one for each hard disk drive or other peripheral) or may have a visual indicator 506 configured to display a different visual indication for each hard disk drive or other peripheral (e.g., different color).

In these and other embodiments, components of chassis 100 and one or more chassis drawers 104 disposed therein may be configured such that visual indicators 506 of compute node chassis drawers 104 may display an indication indicating that a particular chassis drawer 104 and/or indicating that a particular compute node within a chassis drawer 104 has KVM emphasis. Thus, when a user interacts with (e.g., depresses) interface button 502, KVM emphasis may change from one chassis drawer 104/compute node to another, and the visual indicator 506 associated with the chassis drawer 104/compute node to which emphasis has been switched may display an indication indicating that the chassis drawer 104/compute node has KVM emphasis.

In these and other embodiments, components of chassis 100 and one or more chassis drawers 104 disposed therein may be configured such that visual indicators 506 and visual indicators 508 of compute node chassis drawers 104 may display an indication of a status other than KVM emphasis, such as an error alert, an indication of normal operation without an error, a node being selected for an emphasis other than KVM emphasis, or any other suitable indications. In such embodiments, the indication for indicating KVM emphasis may be different than the indication for identifying a chassis drawer 104/compute node as a component of a computing system. For example, in embodiments in which visual indicators 506 and 508 are LEDs, a visual indicator 506 may display one color for indicating KVM emphasis and display another color for indicating identity as a component of a computing system. In addition or alternatively, in embodiments in which visual indicators 506 are LEDs, a visual indicator 506 may blink at one frequency for indicating KVM emphasis and blink at another frequency for indicating identity as a component of a computing system. In addition or alternatively, a visual indicator 506 may display the indication for indicating KVM emphasis for a period of time immediately following the chassis drawer 104/compute node associated with the visual indicator 506 being selected for KVM emphasis, after which the visual indicator may then display the indicator for indicating identity as a component of a computing system, if applicable. In these and other embodiments, visual indicators 508 may indicate a different event or status from visual indicators 506, such as hard disk drive activity.

In these and other embodiments, components of chassis 100 and one or more chassis drawers 104 disposed therein may be configured such that visual indicator 504 associated with interface button 502 may display an indication (e.g., illuminate, blink, or other suitable indication) responsive to a display device being coupled to connector 510. Accordingly, when a user couples a display device to connector 510, a visual indication is given of the interaction the user may perform (e.g., interacting with interface button 502 or 503) in order to select a desired compute node for KVM emphasis, as well as indicating, via a visual indicator 506, of the then-selected compute node for KVM emphasis.

With multiple chassis drawers 104 disposed in chassis 100 all with various visual indicators 506 and 508 providing indication of different events and statuses, such volume of visual indicators may cause a large amount of visual "noise" from the perception of a user, rendering it difficult for such to determine which indicator is providing an indication in response to a user action. Accordingly, in response to a user action (e.g., user interaction with a user interface button 502 or 503, a user coupling a device to connector 510, etc.) a visual indicator 506 or 508 within chassis 100 may indicate selection of a compute node or peripheral in response to such user action, while one or more other visual indicators 506 and 508 of the chassis may "mute" for a period of time after such user interaction, thus limiting the amount of visual noise from the perception of the user. After such period of time, the muted visual indicators may again provide their associated indications. The term "mute" as applied to a visual indicator 506 or 508 shall mean that the visual indicator ceases or is disabled from, during the period of such muting, providing a visual indication it would have otherwise given in absence of such muting. For example in the case of an LED, the LED may mute by remaining unilluminated during the period of such muting.

As a specific example, in response to a user interaction with an interface button 502 or coupling of a device to connector 510, a visual indicator 506 associated with selection of a particular compute node or information handling resource may provide indication of selection (e.g., in the case of an LED, the LED may flash). In addition, for a period of time (e.g., one second) following such user action, one or more of other visual indicators 506 and 508 may mute, and then unmute after such period of time. In some embodiments, all visual indicators 506 and 508 other than the visual indicator 506 indicating selection of the particular compute node or information handling resource may mute. In other embodiments, only certain visual indicators 506 and 508 may mute (e.g., other visual indicators 506 indicating node health and selection may mute, while visual indicators 508 indicating hard disk drive activity may remain active and ummuted).

Although the present disclosure has been described in detail, it should be understood that various changes, substitutions, and alterations can be made hereto without departing from the spirit and the scope of the disclosure as defined by the appended claims.

What is claimed is:

1. A method comprising:
in a chassis comprising a chassis interface and a plurality of slots, each of the plurality of slots configured to receive a drawer and electrically and communicatively couple the drawer to other components of the chassis:
receiving an electrical signal indicative of a user action associated with an element of the chassis interface; and
responsive to the electrical signal:
selecting, from a group of drawers received in a corresponding group of the plurality of slots, a particular drawer;
causing a particular visual indicator associated with the particular drawer to indicate the selecting of the particular drawer;
for a period of time following receipt of the electrical signal, muting a visual indicator of an unselected drawer of the group of drawers to mute; and
at the conclusion of the period of time, unmuting the visual indicator of the unselected drawer;
wherein the plurality of slots include a slot receiving a peripheral drawer and a plurality of slots receiving compute node drawers, including a particular slot receiving a particular compute node drawer, and wherein selecting the particular drawer comprises selecting the particular slot receiving the particular compute node drawer for coupling to the peripheral drawer.

2. The method of claim 1, wherein the chassis includes a plurality of visual indicator types and wherein the particular visual indicator comprises a first type of visual indicator and wherein during the period of time, the particular visual indicator is an only visual indicator of the first type not muted.

3. The method of claim 1, wherein selecting the particular drawer comprises selecting the particular drawer for coupling to a connector of the chassis.

4. The method of claim 1, wherein the peripheral drawer includes a hard disk drive.

5. The method of claim 1, wherein the element of the chassis interface comprises a node select button and wherein selecting the particular drawer comprises a user pressing the node select button until the particular visual indicator indicates selection of the particular drawer.

6. A chassis comprising:
a chassis interface;
a plurality of slots, each of the plurality of slots configured to receive a drawer having one or more information handling resources, wherein each of the plurality of slots is configured to electrically and communicatively couple a corresponding drawer to other components of the chassis; and
a controller communicatively coupled to the plurality of slots and configured to perform operations, comprising:
receiving an electrical signal indicative of a user action associated with an element of the chassis interface; and
responsive to the electrical signal:
selecting, from a group of drawers received in a corresponding group of the plurality of slots, a particular drawer;
causing a particular visual indicator associated with the particular drawer to indicate the selecting of the particular drawer;
for a period of time following receipt of the electrical signal, muting a visual indicator of an unselected drawer of the group of drawers; and
at the conclusion of the period of time, unmuting the visual indicator of the unselected drawer;
wherein the plurality of slots include a slot receiving a peripheral drawer and a plurality of slots receiving compute node drawers, including a particular slot receiving a particular compute node drawer, and wherein selecting the particular drawer comprises selecting the particular slot receiving the particular compute node drawer for coupling to the peripheral drawer.

7. The chassis of claim 6, wherein each of the compute node drawers includes at least one corresponding processor.

8. The chassis of claim 6, wherein the selecting includes:
a first selection, associated with first elements of the chassis interface and indicated by first visual indicators, of the particular compute node drawer, selected from the compute node drawers, as the particular drawer; an
a second selection, associated with second elements of the chassis interface and indicated by second visual indicators, of a particular compute node selected from a plurality of compute nodes within the particular compute node drawer.

9. The chassis of claim 6, wherein selecting the particular drawer comprises selecting the particular drawer for coupling to a connector of the chassis.

10. The chassis of claim 9, wherein the connector of the chassis is configured to couple to a display device.

* * * * *